United States Patent
Aikens et al.

(10) Patent No.: US 9,725,571 B2
(45) Date of Patent: *Aug. 8, 2017

(54) METHOD OF MAKING NANOPOROUS STRUCTURES

(71) Applicant: Mesodynamics, Inc., La Grange, IL (US)

(72) Inventors: John Aikens, La Grange Park, IL (US); John C. Parker, Naperville, IL (US)

(73) Assignee: MESODYNAMICS, INC., Lagrange, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/912,278

(22) PCT Filed: Aug. 13, 2014

(86) PCT No.: PCT/US2014/050805
§ 371 (c)(1),
(2) Date: Feb. 16, 2016

(87) PCT Pub. No.: WO2015/023716
PCT Pub. Date: Feb. 19, 2015

(65) Prior Publication Data
US 2016/0200632 A1 Jul. 14, 2016

Related U.S. Application Data

(60) Provisional application No. 61/865,442, filed on Aug. 13, 2013.

(51) Int. Cl.
*C04B 38/04* (2006.01)
*B29C 67/20* (2006.01)
(Continued)

(52) U.S. Cl.
CPC .............. *C08J 9/26* (2013.01); *B01D 67/003* (2013.01); *B01D 69/02* (2013.01); *B01D 71/025* (2013.01);
(Continued)

(58) Field of Classification Search
None
See application file for complete search history.

(56) References Cited

U.S. PATENT DOCUMENTS

| 8,226,863 | B2 | 7/2012 | Kusuura |
| 2010/0189992 | A1 | 7/2010 | Kusuura |

(Continued)

OTHER PUBLICATIONS

International Search Report and Written Opinion dated Oct. 22, 2014 issued in PCT Patent Application No. PCT/US2014/050805.
(Continued)

*Primary Examiner* — Shamim Ahmed
(74) *Attorney, Agent, or Firm* — Thompson Coburn LLP; Steven M. Ritchey

(57) ABSTRACT

A method of making a nanoporous structure comprising a matrix and at least one nanosized pore within the matrix, wherein the method comprises contacting at least a portion of a templated matrix with an acid solution, wherein the templated matrix comprises a matrix that selected from the group consisting of an organic polymer, a sol-based ceramic, an inorganic salt, an organoaluminate, and combinations thereof, and one or more nanosized templates within the matrix, wherein each nanosized template comprises a core that comprises an inorganic oxide, to dissolve at least a portion of the inorganic oxide of at least one of the cores and form the at least one nanosized pore within the matrix thereby forming the nanoporous structure.

25 Claims, 4 Drawing Sheets

(51) Int. Cl.
| | |
|---|---|
| B29C 41/02 | (2006.01) |
| B31D 3/00 | (2017.01) |
| C08J 9/26 | (2006.01) |
| B01D 67/00 | (2006.01) |
| B01D 69/02 | (2006.01) |
| B01D 71/02 | (2006.01) |
| B01D 71/26 | (2006.01) |
| B01D 71/40 | (2006.01) |
| B01D 71/48 | (2006.01) |
| B01D 71/54 | (2006.01) |
| B01D 71/56 | (2006.01) |
| B29K 83/00 | (2006.01) |
| B29K 105/04 | (2006.01) |

(52) U.S. Cl.
CPC ............ *B01D 71/26* (2013.01); *B01D 71/40* (2013.01); *B01D 71/48* (2013.01); *B01D 71/54* (2013.01); *B01D 71/56* (2013.01); *B29C 41/02* (2013.01); *B29C 67/202* (2013.01); *C04B 38/04* (2013.01); *B29K 2083/00* (2013.01); *B29K 2105/04* (2013.01); *C08J 2201/0442* (2013.01)

(56) References Cited

U.S. PATENT DOCUMENTS

| | | | |
|---|---|---|---|
| 2011/0159240 A1* | 6/2011 | Shiao | B01J 2/006 428/144 |
| 2011/0312080 A1 | 12/2011 | Hatton et al. | |
| 2012/0034418 A1* | 2/2012 | Fairbank | B82Y 30/00 428/131 |
| 2013/0052421 A1 | 2/2013 | Wiesner et al. | |

OTHER PUBLICATIONS

Hoffmann et al., "Silica-Based Mesoporous Organic-Inorganic Hybrid Materials", Mesoporous Materials, 2006, pp. 3216-3251, vol. 45.

* cited by examiner

Figure 1
or
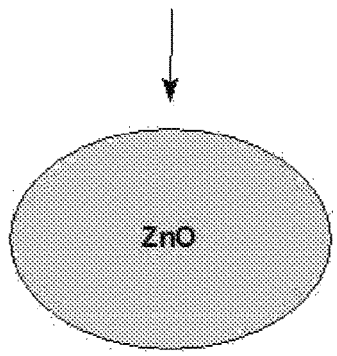
Cure Coating
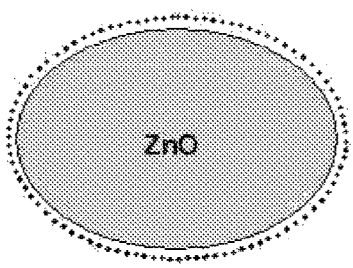
Treat with H⁺
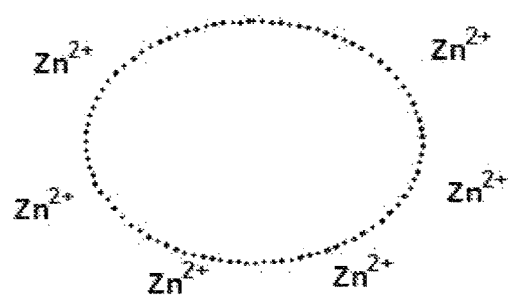

METHOD OF MAKING NANOPOROUS STRUCTURES

CROSS-REFERENCE TO RELATED APPLICATIONS

This application is a U.S. National Stage application of PCT/US14/50805, filed Aug. 13, 2014, which claims the benefit of U.S. Provisional Application 61/865,442, filed Aug. 13, 2013, each of which is incorporated herein by reference in its entirety.

FIELD OF THE INVENTION

The present invention is directed to the preparation of nanoporous structures using a templating method.

BACKGROUND OF INVENTION

The peer reviewed literature and patents disclose numerous examples of defined structures prepared by templating methods. In each of these examples a variety of defined structures have been employed to create an imprint upon a substrate prior to removal of the templating agent. An important feature of such templates is the facility by which they may be removed. Typically, templates are removed by degradation of the material of the template. For example, polystyrene microspheres that form defined pores in a membrane or monolithic ceramics and glasses may be readily removed by thermal treatment of the substrate material to decompose the microspheres. In addition to solid templates, foaming agents have been introduced into materials to afford pores created from entrapped bubbles.

There are numerous drawbacks to these conventional techniques. For example, subjecting the substrate or matrix to significant changes in temperature, pressure, and/or relatively aggressive chemical environments in order to decompose templates often results undesirable changes to the characteristics of the substrate/matrix material. Additionally, such removals and use of foaming agents often result in relatively non-uniform void structures. Still further, the substrate/matrix may retain residues from the template that alter the function or physical characteristics of the substrate. For example, template removal rarely allows for the substrate/matrix to maintain chemical functionality within the inner surface of the substrate vacated by the template. In addition, template defined materials are often prepared using expensive templates or labor intensive multi-step procedures that limit final applications to high value-added products and have precluded widespread industrial use. In fact, the use of templates has been so costly and/or burdensome that many defined structural materials are manufactured using self-assembly of substrate materials that define and commonly determine the final structure of the material (e.g., synthetic zeolites).

In view of the foregoing, a need exists for an adaptable and versatile method for preparing well-defined, cost-effective template prepared materials.

SUMMARY OF INVENTION

In one embodiment, the present invention is directed to a method of making a nanoporous structure comprising a matrix and at least one nanosized pore within the matrix. The method comprising contacting at least a portion of a templated matrix with an acid solution, wherein the templated matrix comprises:

(i) a matrix that selected from the group consisting of an organic polymer, a sol-based ceramic, an inorganic salt, an organoaluminate, and combinations thereof; and (ii) one or more nanosized templates within the matrix, wherein each nanosized template comprises a core that comprises an inorganic oxide; to dissolve at least a portion of the inorganic oxide of at least one of the cores and form the at least one nanosized pore within the matrix thereby forming the nanoporous structure.

BRIEF DESCRIPTION OF THE DRAWINGS

FIG. 1 is a schematic of an embodiment of the present invention in which a ZnO template is coated with a silicate and then ZnO template is dissolved to yield a silicate shell or a functionalized silicate shell.

DETAILED DESCRIPTION OF INVENTION

Historically, nanomaterials have been considered value added products dictated by the preparation and processing methods that are low yielding or costly. In addition very few nanomaterials can be degraded without leaving residues under mild conditions. The method of the present invention addresses these concerns and allows for the product of nanoporous structures in a relatively low cost and readily implementable manner. Further, this method may be performed without significantly degrading or negatively affecting the matrix or the formed voids or pores. Still further, in certain embodiments, the method may be performed to produce nanoporous structures having one or more nanosized pores that are functionalized.

Specifically, the method of the present invention is directed to making a nanoporous structure from a templated matrix, wherein the templated matrix comprises (i) a matrix that that is selected from a group consisting of an organic polymer, a sol-based ceramic, an aluminum salt, an organoaluminate, an aluminosilicate, and combinations thereof and (ii) one or more nanosized templates within the matrix, wherein each nanosized template comprises a core that comprises an inorganic oxide. The method comprises contacting at least a portion of the templated matrix with an acid solution to dissolve at least a portion of the inorganic oxide of at least one of the cores and form the at least one nanosized pore within the matrix thereby forming the nanoporous structure.

Advantageously, the above-described method and the materials allow for significant flexibility with regard to the type and characteristics of the formed nanoporous structure. For example, in one embodiment of the present invention the nanoporous structure is a shell such as depicted in FIG. 1.

Figure 2:
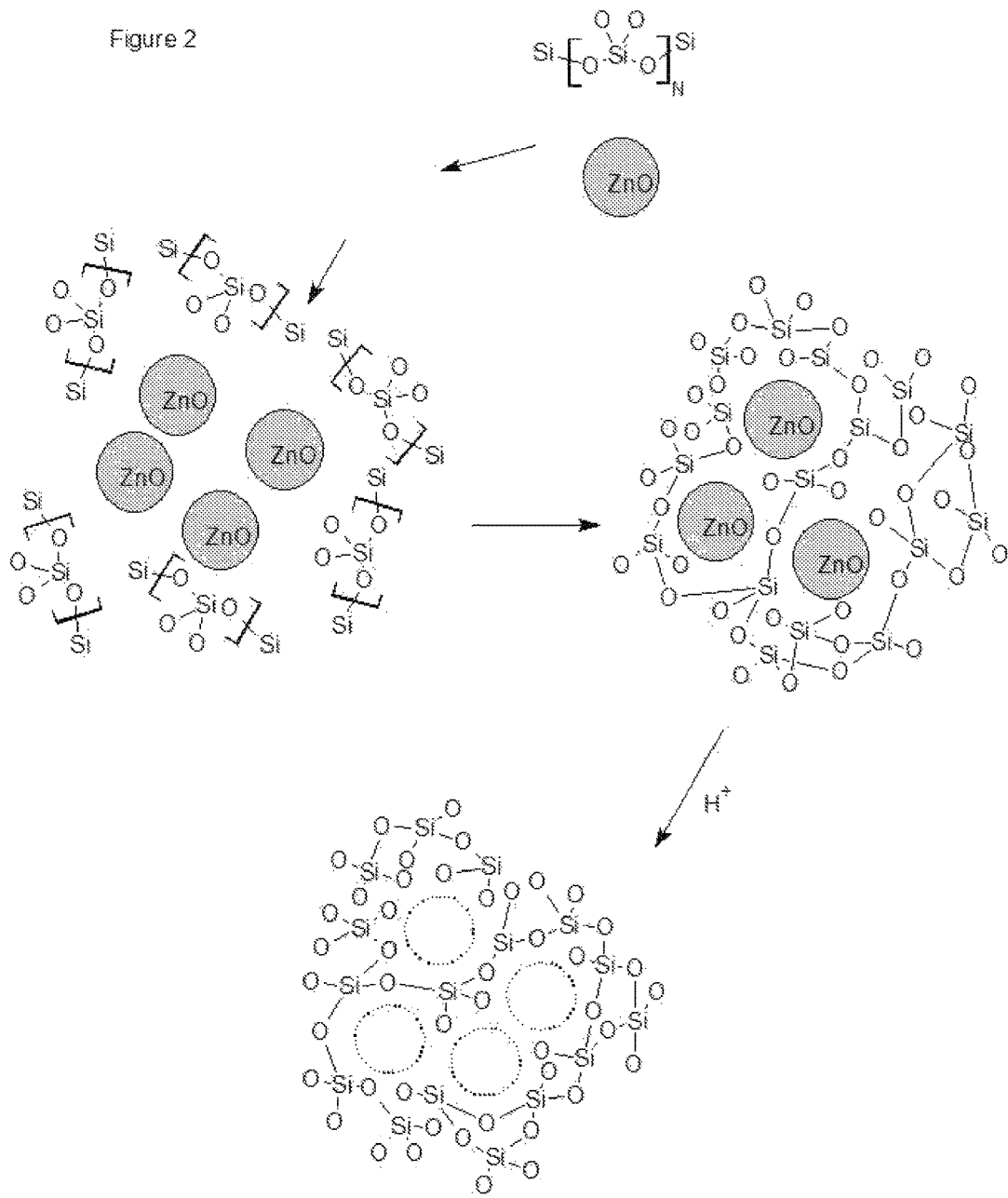
FIG. 2 is a schematic of an embodiment of the present invention in which ZnO templates are set in a silicate matrix or functionalized silicate matrix and then the ZnO templates are dissolved to yield a silicate or functionalized silicate structure with nanosized voids.
Figure 3:
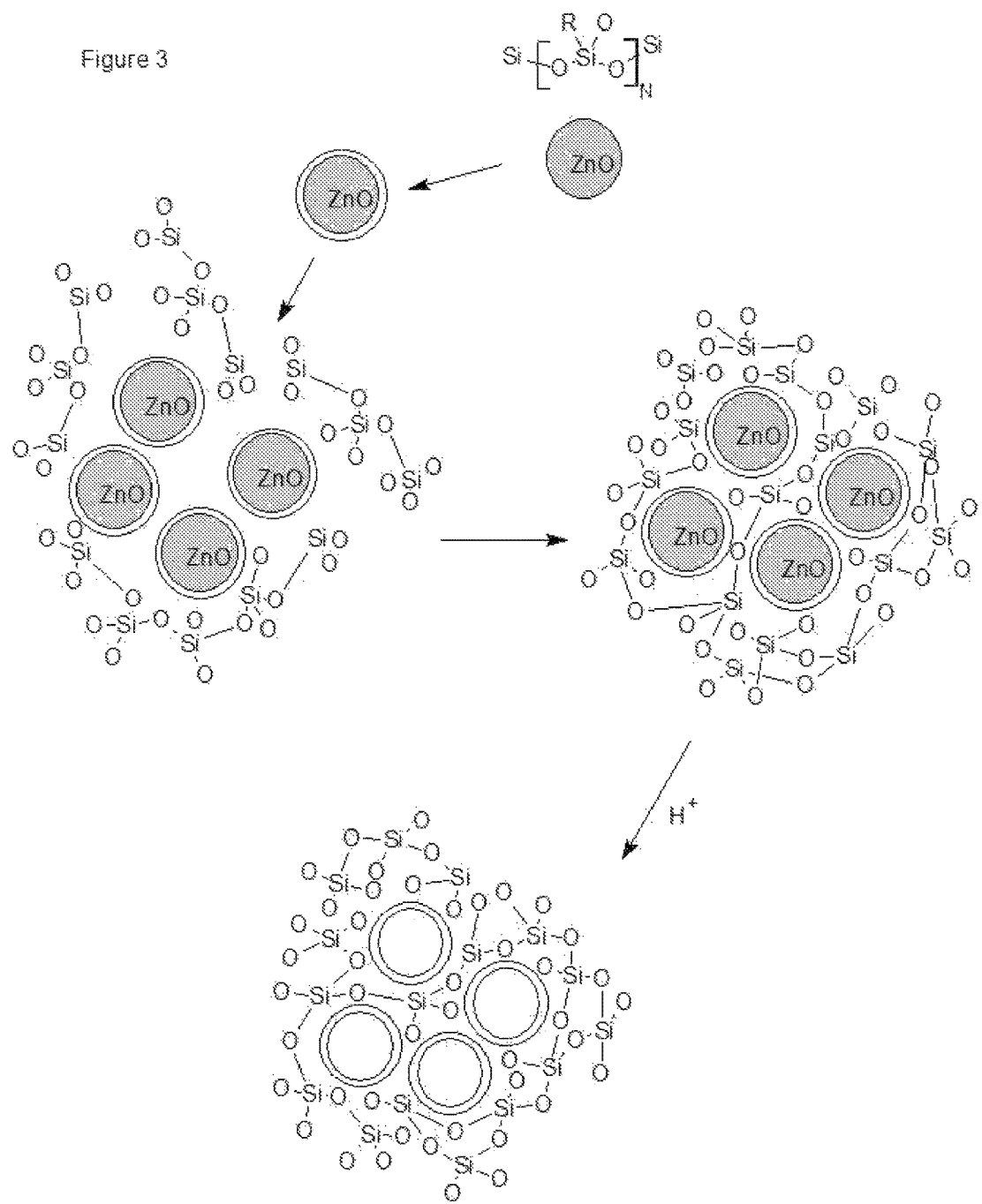
FIG. 3 is a schematic of an embodiment of the present invention in which functionalized coated ZnO templates are set in a silicate matrix or a functionalized silicate matrix and then the ZnO templates are dissolved leaving the functionalized coating that was coated on the ZnO templates defining nanosized void structures in the matrix.

Described differently, such a shell is an individual hollow particle in which the shell is the matrix and the pore or void therein is the result of dissolving the inorganic oxide of a nanosized template. Alternatively, in other embodiments of the present invention the nanoporous structure is a monolith or a film such as depicted in FIG. 2. Still further, the aforementioned shells, monoliths, and films have a pore/void or pores/voids (as the case may be) that are functionalized such as depicted in FIG. 3. In yet another embodiment, the aforementioned shells, monoliths, and films have one or more surfaces that are functionalized and one or more pores/voids (as the case may be) that are not functionalized, which may be useful for the production of a thin film of functionalized matrix having a controlled porosity imparted by the dissolution of the templates. Still further, such a thin film may comprise multiple layers of differently functionalized matrix material(s). In still another embodiment, the aforementioned shells, monoliths, and films have one or more surfaces that a functionalized and the one or more pores/void (as the case may be) are also functionalized.

I. Templates

A. Cores

As indicated above, a template comprises at least a core and the core comprises an inorganic oxide. In certain embodiments the template consists of the core. In certain embodiments, the core consists of the inorganic oxide.

B. Inorganic Oxide

The aforementioned benefits and flexibility are based, in part, on the material(s) selected for the templates. Nanoparticles comprising and/or consisting of inorganic oxide are readily available and certain inorganic oxides nanoparticles are available for a relatively low cost while still allowing for a significant degree of freedom with respect to size and shape, the selection of which allows for a degree of customization depending upon the particular desired application. In certain embodiments, the inorganic oxide is selected from the group consisting of $Fe_xO_y$, ZnO, $SnO_2$, CaO, $SiO_2$ and combinations thereof. In certain embodiments, the inorganic oxide is ZnO. Additionally, in certain embodiments, the templates may be of the same composition or the templates may be of different compositions (e.g., particles comprising different oxide(s) or particles comprising the same oxides at different relative amounts or concentration levels).

Zinc oxide is often selected because nanoparticles comprising or consisting of zinc oxide are generally commercially available at a relatively low cost, in particular compared to other inorganic oxides. Such nanoparticles are often prepared by a physical vapor synthesis (PVS) process, which is a relatively high yield, low cost process that produced high quality material. Additionally, the PVS process allows for the particle size distribution to be controlled for a particular application specifications (e.g., from narrow to broad primary particle size distributions) without adding significant cost to the nanomaterial.

Advantageously, ZnO particles are hydrophilic and are easily wet by or dispersed in aqueous liquids/solutions used to form the matrix (i.e., liquid matrix precursor described in greater detail below). But if it is desired for ZnO particles to be wet by or dispersed in non-aqueous liquids/solutions, this is also readily accomplished because ZnO particles may be surface treated to impart this characteristic with, for example, a compatibilizer coating (described in greater detail below). Further, ZnO is considered to be thermally stable and tolerant to many solvents, excluding solutions comprising mineral acids in which it is considered to be highly soluble. It is this characteristic that allows ZnO nanoparticles (depending upon the size) to be readily removed from a matrix under relatively mild acidic conditions such that the matrix tends not to be negatively affected (e.g., attacking the matrix or leaving undesirable residues). Still further, ZnO has been found to be labile with respect to extremes in pH (i.e., it is freely soluble below a pH 2 and above a pH 10 and is converted to $Zn^{+2}$ ions). Additionally, results to date show that no significant residual ZnO or $Zn^{+2}$ ions remain in the matrix after it is dissolved and the matrix is appropriately washed and/or soaked. In view of the foregoing, nanoparticulate zinc oxide tends to be an attractive template to create defined nanoporous voids in a wide variety of materials.

C. Size of Cores

The cores may be of essentially any size(s) and/or of a size distribution(s) appropriate for a desired application. As used herein, the term "size," with respect to nanoparticles, means nanoparticles able to pass through a sieve opening of that size. Sieve openings are square in shape and the size of the opening corresponds to the length of a side. For example, a spherical nanoparticle having a diameter less than 40 nm is able to pass through a 40 nm sieve opening. Similarly, a nanoparticle that is a rod having a length greater than 40 nm having and a diameter less than 40 nm is able to pass through a 40 nm sieve opening.

In certain embodiments, the core(s) used to make particular nanoporous structure(s) may be of relatively uniform size or have a relatively narrow particle size distribution (e.g., the particles have a mean size and at least about 80% of the particles are within about ±40% of the mean). In other embodiments, the core(s) used to make particular nanoporous structure(s) may be of a relatively broad particle size distribution (e.g., the particles have a mean size and log-normal size distribution). In still other embodiments, the core(s) used to make particular nanoporous structure(s) may be within more than one distinct particle size groups (e.g., the particles may be within two particle size groups, wherein the groups have a mean size of, e.g., 40 nm and 100 nm). Advantageously, by controlling the particle size/particle size distribution one may be able to create a nanoporous structure that is suitable for a particular application. For example, one may be able to create a nanoporous structure suitable for the controlled release of a compound such as a drug by using cores of a suitable mean size and having a relatively uniform size and/or narrow particle size distribution.

In certain embodiments, the core(s) are of a size that is less than about 500 nm. In further embodiments, the core(s) are of a size that greater than about 20 nm. In other embodiments, the core(s) are of a size that is in a range of about 20 nm to about 150 nm. In still other embodiments, the core(s) are of a size is in a range of about 30 nm to about 80 nm. To be clear, when referring to a size within a range it is intended to encompass embodiments wherein the cores of different sizes within said range and embodiments wherein the cores are of a relatively uniform size within said range.

Experimental results to date suggest that for cores consisting of ZnO of a size in the range of about 30 nm to about 80 nm, allow for relatively small pores/voids to be formed and are relatively easy to make a templated matrix but tend to be more expensive. Whereas, cores of sizes less than about 20 nm tended to be more difficult to make a templated matrix with due to the fact that they tend to be colloidal. Additionally, they are even more expensive. In contrast, ZnO nanoparticles in the size range of about 50 nm to about 500 nm tend to be significantly less costly and are also readily used to make a templated matrix. That said, experimental results to date suggest that as the size of ZnO nanoparticle cores exceeds about 50-200 nm, the cores tend to take significantly longer to completely dissolve with the acid.

D. Shapes of Cores

The cores may be of essentially any shape appropriate for a desired application. For example, the cores may have a shape selected from the group consisting of spherical, ellipsoidal, and polyhedral. When referring to a particular shape herein, it is intended to include cores having that shape and of a configuration that is substantially the same as or similar to that shape. It is also worth noting that in any given templated matrix the cores may be of different shapes. Without being limiting, examples of polyhedral shapes include pyramid, hexahedron (cube, rhombohedron, parallelepiped, cuboid, triangular dipyramid), dodecahedron, isododecahedron, rhombic triacontahedron, elongated pentabonal cupola, octagonal prism, and square antiprism. That said, it is anticipated that the vast majority of applications will be adequately accommodated using the relatively simple and easy to manufacture spherical or spheroidal shape.

E. Functional Coatings

In other embodiments, the template(s) comprises components in addition to the core. For example, the template(s) may comprise a functional coating on at least a portion of the core so that, upon dissolution of the at least a portion of the inorganic oxide of the core, the functional coating defines at least a portion of the corresponding nanosized pore within the matrix. In certain embodiments, the functional coating encompasses or essentially encompasses a core that consists of the inorganic oxide such that, upon dissolution of the inorganic oxide of the core, the functional coating defines all or essentially all of the nanosized pore within the matrix.

In some embodiments, the templated matrix comprises a single functionalized nanosized template. In other embodiments, the templated matrix comprises a multiplicity of functionalized nanosized templates. In still other embodiments, essentially all of the nanosized templates are functionalized.

It is also important to note that a templated matrix may comprise functionalized templates wherein the functional coatings fall into at least two distinct compositional groups (e.g., functional coatings comprising different compositions or comprising the same compounds but at different relative amounts or concentration levels). In certain embodiments, the functional coating has a thickness that is in a range of about 0.5 nm to about 2.0 nm.

Still further, a functional coating may comprise one or more layers of identical composition (i.e., the same functional material(s) at the same relative amount and/or concentration levels). Alternatively, a functional coating may comprises more than one layer in which the layers are of different composition (e.g., different materials or the same materials at different relative amounts or concentration levels). The thickness of the layer(s) may be selected as desirable and appropriate for the application.

The functional material used in the functional coating may be selected from essentially anything appropriate and desirable for a particular application. For example, the functional material selected from the group consisting of organosiliianes, alkoxyorganosilanes, haloorganosilanes, polymeric organosilanes, and combinations thereof. Advantageously, by using a functional coating the pores/voids of the nanoporous structure may have organic and/or inorganic functional groups selectively assembled onto the void surface, which is believed to be heretofore unavailable feature.

Functional coatings may be applied to cores according to any appropriate method. Exemplary methods include solution phase application, high intensity dry mixing and spray/tumble mixing.

II. Substrate/Matrix Materials

Similarly, the matrix may be formed of essentially any appropriate material for the desired application that when subjected to the acid solution is either substantially non-reactive with the acid or, if reactive, the result is desirable or does not negatively affect the matrix for the desired application. Further, the aforementioned benefits and flexibility of the method of the present invention are based, in part, on the material(s) selected for the matrix.

A. Organic Polymers

In one embodiment, the matrix comprises an organic polymer. In another embodiment, the matrix consists of one or more organic polymers. Exemplary organic polymers include polyurethanes, polyethylenes, polystyrenes, polyacrylates, alginates, polyesters, polyamides, and combinations thereof. In another embodiment, the organic polymer is selected from the group consisting of polyurethanes, alginates, polyamides, polyesters, and polyacrylates, and combinations thereof. In yet another embodiment, the organic polymer is selected from the group consisting of polyamides, alginates, polyacrylates, and combinations thereof.

In one embodiment, the matrix comprises an organic polymer selected from said exemplary organic polymers and combinations thereof. In another embodiment, the matrix consists of an organic polymer selected from said exemplary organic polymers or a combination of said exemplary organic polymers. It is to be noted that for organic polymers that tend to be hydrophobic, coatings may be added to the templates to aid in their dispersion in the matrix.

B. Sol-based Ceramics

In one embodiment, the matrix comprises a sol-based ceramic. In another embodiment, the matrix consists of one or more sol-based ceramics. Exemplary sol-based ceramics include silicates, aluminates, aluminosilicates, titanates, and zirconates and combinations thereof. In another embodiment, the sol-based ceramics is selected from the group consisting of silicates, aluminates, titanates, and combinations thereof. In another embodiment the sol-based ceramic is one or more silicates. In another embodiment, the sol-based ceramic is one or more aluminates.

In yet, another embodiment, the sol-based ceramic is a combination of one or more silicates and one or more aluminates.

1. Silicates

Exemplary silicates include silanes such alkoxysilanes, organosilates, alkoxyorganosilanes, halosilanes, haloorganosilanes, organoalkoxysilane polymers, and combinations thereof. In another embodiment, the silicates are selected from the group consisting of silanes, halosilanes, organosilanes, alkoxyorganosilanes, alkoxysilanes, and combinations thereof. In yet another embodiment, the silicates are selected from the group consisting of alkoxyorganosilanes, alkoxysilanes, and combinations thereof. In still another embodiment, the silicates are alkoxysilanes such as but not limited to tetramethoxysilane, tetraethoxysilane and tetraproxysilane.

Silanes may be described according to chemical structure (1) below

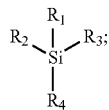

(1)

wherein $R_1$, $R_2$, $R_3$ and $R_4$ are independently selected from among alkyl, aryl, alkoxy, aryloxy, alkylether, arylether, akylester, arylester, amidoalkane, chloro, and siloxy. Preferred hydrocarbon chain lengths are 1 to about 18 carbons long. Chlorosilanes, wherein the alkoxy group in the formula above is replaced by a chlorine atom, are generally known to be more reactive to surface Si—OH groups, but are also much more reactive towards water. Thus, chlorosilanes are preferred for reaction in aprotic organic solvents but not water.

In one embodiment, the sol-based ceramic comprises one or more alkoxysilanes. Examples of appropriate alkoxysilanes include tetraethoxysilane, tetramethoxysilane, tetrapropoxysilane, and combinations thereof. Experience to date suggests that tetraethoxysilane and tetramethoxysilane may be particularly desirate depending upon the solvent system because of their relatively low cost and well understood characteristics and properties.

In one embodiment, the matrix comprises a silane selected from said exemplary silanes and combinations thereof. In another embodiment, the matrix consists of a silane selected from said exemplary silanes or a combination of said exemplary silanes.

2. Titanates

Exemplary titanates include organotitanates, halotitanates, alkoxytitanates, and combinations thereof. In another embodiement, the titanates are alkoxytitanates. Exemplary alkoxytitanates are tetraethoxytitanate, tetrabutoxytitanate, tetraisopropoxytitanate, and combinations thereof.

3. Densification

If increased densification of sol-based ceramics is desired, this may be accomplished by subjecting the material to an elevated temperature (e.g., about 150° C. or higher) to cause present organic functional groups to decompose. It is to be noted that the densified sol-based ceramic(s) are in a metastable state in which a portion of the potential reactive M—OH sites are precluded from further condensation reactions by steric bond geometry limitations and that the pores remain essentially intact upon template dissolution. Interestingly, as a result of such metastability, it is believed that the matrix comprises molecular channels in addition to the pore/voids. Such metastable matrices are believed to be very unique and with correspondingly unique structures/applications being available. Examples of such include mesoporous silica and alumina.

C. Inorganic Salts

In one embodiment, the matrix comprises one or more inorganic salts, the precursors of which include but are not limited to halides (e.g., chlorides and bromides), nitrates, phosphates or sulfates of silicon, aluminum and titanium, and combinations thereof. In another embodiment, the inorganic salts are selected from the group consisting of nitrates, phosphates, and sulfates of silicon, aluminum, and titanium, and combinations thereof. In yet another embodiment, the inorganic salts are selected from the group consisting of nitrates and sulfates of silicon, aluminum, and titanium, and combinations thereof.

In one embodiment, the matrix consists of one or more aluminum salts. Exemplary aluminum salts include aluminum hydroxide, aluminum nitrate, aluminum phosphate, aluminum sulfate, aluminum halides. It is worth noting that aluminum halides have limited suitability due to their reactive nature in aqueous or near aqueous solutions, which are typical for most sol-based ceramics. In some embodiments, the one or more aluminum salts are nitrate and/or sulfate salts because they tend to form stable solutions and tend to be modestly reactive under defined pH conditions. In one embodiment, the matrix comprises an aluminum salt selected from said exemplary aluminum salts and combinations thereof. In another embodiment, the matrix consists of an aluminum salt selected from said exemplary aluminum salts and combinations thereof.

D. Organoaluminates

In one embodiment, the matrix comprises an organoaluminate. In another embodiment, the matrix consists of one or more organoaluminates. Exemplary organoaluminates include aluminum tri-sec butoxide, aluminum tributoxide, aluminum triisopropoxide, aluminum tripropoxide, aluminum triethoxide, and aluminum trimethoxide. In an embodiment, the organoaluminates are aluminum trisecbutoxide and aluminum isopropoxide. In one embodiment, the matrix comprises an organoaluminate selected from said exemplary organoaluminates and combinations thereof. Although the combination of aluminum trisecbutoxide and aluminum isopropoxide are readily viable, other combinations are more difficult to accommodate in a commercially significant manufacturing operation due to their reactive nature. Other combinations involving aluminum tributoxide are technically viable but, due to its cost, are generally not considered to be commercially viable. In another embodiment, the matrix consists of an organoaluminate selected from said exemplary organoaluminates and combinations thereof.

E. Combinations of Matrix Material Types

In one embodiment, the matrix is selected from a group consisting of an organic polymer, a sol-based ceramic, aluminum salt, an organoaluminate, an aluminosilicate, and combinations thereof as described in greater detail above.

III. Template Dissolution

As indicated above, at least a portion of the inorganic oxide of at least one of the cores is dissolved with an acid solution to form the at least one nanosized pore within the matrix thereby forming the nanoporous structure. It is typically preferred for the entire of the templated matrix to be contacted with the acid solution in order optimize the efficiency of the dissolution. The acid may be contacted with the templated matrix according to any appropriate method such as spaying, immersing, or vapor treatment. Although the dissolution may be conducted in a manner such that not all of the inorganic acid of the at least one of the cores is dissolved, it is typically desirable to dissolve essentially all of the inorganic oxide of at least one of the cores and preferably of essentially all the cores in the matrix.

A wide variety of acids may be used to dissolve the inorganic oxide(s). In particular, mineral acids such as HCl, $H_2SO_4$, $HNO_3$, $H_3PO_4$ and combinations thereof may be used. The concentration of the acid(s) may also be within a relatively wide range of concentrations appropriate for the matrix and the template. In one embodiment, the acid is hydrochloric acid and it is at concentration in the acid solution that is in a range of about 0.2 M to about 0.5 M. Additionally, the dissolution may be accomplished by contacting the templated matrix with different solutions comprising different acids and/or of different concentrations.

Advantageously, the acid solution comprising the dissolved inorganic oxide may be collected and sold and/or used as a desirable co-product rather than being a waste. For example, the collected acid solution comprising the dissolved inorganic acid may be used to prepare a coating and/or electroplating solution comprising solute metal ions from the dissolved inorganic oxide in the collected acid solution. Specifically, such solute zinc ions may make the collected solution desirable for preparing solutions used in galvanizing.

As described in greater detail below, the matrix can be of different forms such as shells/particles/powder and consolidated structures such as monoliths and films/membranes. Experimental results to date suggest that the mesoporous matrix is the primary kinetic barrier to removing the template. As would be expected, templates in shells/particles/powders typically dissolve substantially quicker than when identically templates and matrix materials are in the form of monoliths. For example, it has been observed that templates in shells/particles/powders and films may be completely dissolved in as little as about 1 minute whereas monoliths of a maximum cross-sectional distance of about 1 centimeter have taken as long as about 3 hours to completely dissolve the templates therein.

IV. Making a Templated Matrix

A templated matrix may be formed by coating the one or more nanosized templates with a liquid matrix precursor and curing the liquid matrix precursor of the coated one or more nanosized templates thereby forming the templated matrix. With respect to the coating step, any appropriate method or practice may be utilized. Examples include spraying templates with the liquid matrix precursor such as by nebulizer, or aerosol generator (paint sprayer); and mixing templates and liquid matrix precursor together with one or more types of agitation such as stirring, folding, screw mixers, ultrasonic, high shear, paddle, vortex, and pressure expansion. With respect to the curing step, it is typically advisable to allow the curing of the liquid matrix precursor to be sufficiently complete so that when the templated matrix is contacted with the acid solution the voids/pores formed by the dissolution of the inorganic acid tend to be dimensionally stable. Stated another way, it is typically desirable for the templated matrix to be cured at least to the extent that the voids/pores don't collapse.

The relative amounts of template(s) and liquid matrix precursor will depend, at least in part, on the type of contacting and the desired properties of the templated matrix and/or nanoporous structure obtained therefrom (e.g., pore-related properties such as the degree of porosity and pore size, and physical properties such as tensile, flexural, and/or compressive strength, or density, etc.). That said, experimental results to date indicate that the ratio of ZnO nanoparticles to alkoxysilane sol liquid precursor may be in the range of about 1:1000 to about 5:1 by weight.

Another factor regarding the above-described coating step is the compatibility of the template(s) and the liquid matrix precursor such that liquid matrix precursor wets the one or more nanosized templates. In certain embodiments, it is possible that the outer surface of the desired nanosized templates (e.g., the core or the functional coating) is not wet by the desired liquid matrix precursor. In that event, the nanosized templates may further comprise a compatibilizer coating that allows the liquid matrix precursor to wet the one or more nanosized templates. Exemplary compatibilizer materials for making a compatibilizer coating include organosilanes, alkoxyoranosilanes and haloorganosilanes, and combinations thereof. The compatibilizer coating may be applied to the templates by any appropriate method such as disclosed for the functional coating. In certain embodiments, the compatibilizer coating has a thickness that is in a range of about 0.1 nm to about 2 nm.

V. Exemplary Substrate Structures

A. Shells

As indicated above, the aforementioned methods of making a templated matrix and the nanoporous structure formed therefrom may be performed to make a variety of structure types. One such type of nanoporous structure is an individual shell or shell particles, wherein the shell comprises the matrix and, optionally, a compatibilizer coating and/or functional coating and within the shell is a nanosized pore that is formed from a templated matrix that comprises a core and, optionally, a functional coating and/or compatibilizer coating. Although the nanoporous structure is an individual shell, it is typical for a multiplicity of such shells to be made when conducting a process according to the methods set forth herein. When making such a multiplicity of shells, a multiplicity of templated matrices are typically formed by appropriate methods (e.g., precipitation, polymerized, or otherwise deposited onto surfaces of nanoparticles dispersed therein, wherein the ratio of nanosized templates to liquid matrix precursor is in a range of about 10:1 to about 100:1 by weight.

B. Consolidated Structures

In addition to shells, the present invention may be used to form nanoporous structures that are referred to "consolidated structures" such as monoliths and films/membranes that comprise a multiplicity of nanosized pores or voids.

1. Monoliths

In the case of monoliths, the process further comprises placing the nanosized templates coated with liquid matrix precursor in a monolith mold. When making such monoliths, results indicate that the ratio of nanosized templates to liquid precursor may be in a range of about 1:100 to about 100:1 by weight.

2. Films

In the case of films/membranes, the process further comprises placing the nanosized templates coated with the liquid matrix precursor on a film-forming surface by any appropriate process such as spin coating, dip coating, spray coating, and combinations thereof.

VI. Exemplary Applications

The methods of the present invention may be conducted to form nanoporous structures suitable for a wide variety of applications. One such application category is a controlled release agent for a compound that is, for example, a fragrance, flavor, drug, drug, pigment, etc. Current products include silica gels and b-cyclodextrins but they don't afford nanosized domains and lack discrete engineered binding elements such as functional coatings. Another application category is selective separation agent for separating liquids and gases based on, for example, size and/or chemical property. Yet another application category is catalysts and engineered functional materials.

VII. Examples

A. Example 1—Silicate Shells

Approximately 4.3 ml of ethanol (dried over 4A molecular sieves) and 4.7 ml (21 mmol) of tetraethoxysilane were added to a round bottom flask under inert atmosphere and the solution was stirred. While continuing to stir the solution, approximately 0.262 ml deionized water was added followed by approximately 0.162 ml 0.1 M aqueous hydrochloric acid. This mixture was heated for 1.5 hours at 65° C. and the resulting sol solution was cooled to room temperature.

Approximately 8.5 ml of deionized water followed by approximately 1.5 grams of nanoparticulate zinc oxide powder obtained from Nanophase Technologies with a nominal particle size of 70 nm (15 $m^2/g$) with vigorous stirring were added to another round bottom flask to form a slurry or dispersion. Approximately, 1.5 ml of the sol solution was added to the slurry followed by continued mixing for about 30 minutes to deposit a sol coating on the nanoparticles. Then, the slurry was centrifuged to separate the solids from the liquid. The separated solids were washed twice with a 1:1 mixture of ethanol and water to remove excess sol coating. The coated zinc oxide nanoparticles were then dispersed in 0.1 M aqueous hydrochloric acid and stirred gently for about one hour. During that time the solids became translucent. The translucent solids were separated from the liquid by centrifugation and washed two times with deionized water to remove residual acid and zinc ions.

The coating material remaining following dissolution of the template material resembles a hollow sphere that is composed of the original coating material. The shells retain roughly the shape of the nanotemplate in which the degree of shape stability depends, at least in part, upon the thickness of the coating. Generally, the thicker the original coating the more rigid the final shell and subsequently the more the shell retains the template shape.

B. Example 2—Silicate monolith with nanosized voids

Approximately 4.3 ml of ethanol (dried over 4A molecular sieves) and 4.7 ml (21 mmol) of tetraethoxysilane were added to a round bottom flask under inert atmosphere and the solution was stirred. While continuing to stir the solution, approximately 0.262 ml deionized water was added followed by approximately 0.162 ml 0.1 M aqueous hydrochloric acid. This mixture was heated for 1.5 hours at 65° C. and the resulting sol solution was cooled to room temperature.

Approximately 1 gram of 70 nm (15 $m^2/g$) nanoparticulate zinc oxide obtained from Nanophase Technologies was dispersed in approximately 9 ml of deionized water using stirring and sonication in a bath sonicator. Approximately 1 ml of the 10% ZnO dispersion was added to about 2 ml of sol with sonication to such that was a ZnO to silicon ratio of about 1:2.5 by weight. Then about 100 μL of 1 M $NH_4OH$ was added while being mixed and then the dispersion was allowed to stand until gelation occurred. The gelled monolith was then cured to form a template-containing xerogel by heating at 30° C. and slowly drying until the size of monolith remained constant, which took several days. The template-containing monolithic xerogel, which was opaque, was soaked in 0.1 M aqueous hydrochloric acid until it became translucent to transparent, which took about 24 hours. The residual acid and zinc ions were removed by soaking the monolith in deionized water. The template-free monolith was then removed from the water bath and allowed to dry.

The monolithic structure retained both its shape and size following the dissolution treatment. When the templates were removed the matrix became transparent, however, upon drying a translucent appearance reemerged. The translucent appearance is believed to be the result of the multiple light scattering and refractive index differences between the matrix silicate and the air filled nanopores throughout the monolithic structure.

C. Example 3—Silicate monolith with nanosized functionalized voids

1. Coated Templates

Approximately 4.3 ml ethanol (dried over 4A molecular sieves) and 3-aminopropyltriethoxysilane 4.7 ml (20 mmol) were added to a round bottom flask under an inert atmosphere and stirring. About 0.262 ml deionized water followed by about 0.162 ml 0.1 M aqueous hydrochloric acid were added. The mixture was heated for about 1.5 hours at about 65° C. and the resulting sol solution was cooled to room temperature.

Approximately 8.5 ml of deionized water followed by approximately 1.5 grams of 70 nm (15 $m^2/g$) nanoparticulate zinc oxide powder from Nanophase Technologies with vigorous stirring were added to another round bottom flask to form a slurry or dispersion. Approximately, 1.5 ml of the sol solution was added to the slurry followed by continued mixing for about 30 minutes to deposit a sol coating on the nanoparticles. Then, the slurry was centrifuged to separate the solids from the liquid. The separated solids were washed twice with a 1:1 mixture of ethanol and water to remove excess sol coating.

2. Monolith Preparation

Approximately 4.3 ml of ethanol (dried over 4A molecular sieves) and 4.7 ml (21 mmol) of tetraethoxysilane were added to a round bottom flask under inert atmosphere and the solution was stirred. While continuing to stir the solution, approximately 0.262 ml deionized water was added followed by approximately 0.162 ml 0.1 M aqueous hydrochloric acid. This mixture was heated for 1.5 hours at 65° C. and the resulting sol solution was cooled to room temperature.

Approximately 1 gram coated of 70 nm (15 $m^2/g$) nanoparticulate zinc oxide from Nanophase Technologies was dispersed in approximately 9 ml of deionized water using stirring and sonication in a bath sonicator. Approximately 1 ml of the 10% coated ZnO dispersion was added to about 2 ml of tetraethoxysilane sol with sonication to such that was a ZnO to silicon ratio of about 1:2.5 by weight. Then about 100 μL of 1 M $NH_4OH$ was added while being mixed and then the dispersion was allowed to stand until gelation occurred. The gelled monolith was then cured to form a template-containing xerogel by heating at 30° C. and slowly drying until the size of monolith remained constant, which took several days. The template-containing monolithic xerogel, which was opaque, was soaked in 0.1 M aqueous hydrochloric acid until it became translucent to transparent, which took about 24 hours. The residual acid and zinc ions were removed by soaking the monolith in deionized water. The template-free monolith was then removed from the water bath and allowed to dry.

The functional coating left behind within the nanopores have similar structures to the shell materials described above except that the organic functionality is included as a substituent of the coating held within the matrix. Detection of accessible amino groups is performed using a ninhydrin or fluoresamine assay. In the case of the ninhydrin assay, organoamine functional coating components were identified and localized within the monolith by creating ninhydrin adducts with the amino groups on the coating. To this end, the dried template-removed monolith containing amino coated nanopores was soaked with 0.1 mM ninhydrin solution in ethanol. The monolith was removed from the solution and excess reagent dried from the surface. The monolith was then heated at 100° C. for 5 minutes until the monolith became a deep purple color indicating the formation of ninhydrin amine adducts. A control experiment using a monolith containing nanopores prepared without an amino coating and treated under the same experimental conditions failed to show any measureable color change. The experiment was extended by substituting fluorescamine as the indicator reagent. Once again treatment of both amine coated and uncoated monoliths with 0.01 mM fluorescamine reagent showed colorimetric reaction with monoliths containing only amine coated nanopores.

Figure 4:
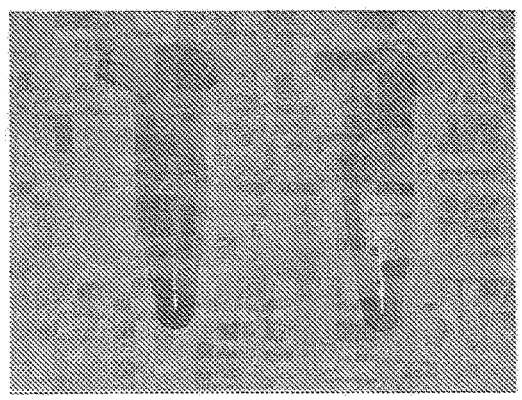
FIG. 4 is a photographic comparison showing the difference in the binding of anionic molecules (i.e., Coomassie Brilliant Blue dye dissolved in water) to silicate shells having quarternary amine functionalized interior surfaces and those without functionalized interior surfaces.

As shown in FIG. 4, the binding ability of shells with quaternary amine functionalized interior surfaces to bind anionic molecules dissolved in the appropriate solvent. In this case, the anionic molecules were Coomassie Brilliant Blue dye and the solvent was water. After being exposing the functionalized shell powder and comparative nonfunctionalized shell powder, they were washed with water and the remaining dye bound to the powder was assessed by spectroscopy.

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making a nanoporous structure comprising a matrix and at least one nanosized pore within the matrix, the method comprising:
    contacting at least a portion of a templated matrix with an acid solution, wherein the templated matrix comprises:
    a matrix comprising a sol-based ceramic selected from the group consisting of a sol-based silicate, a sol-based alum inate, a sol-based aluminosilicate, a sol-based titanate, a sol-based zirconate, and combinations thereof; and
    (ii) at least one nanosized template within the matrix, wherein each nanosized template comprises a core that comprises an inorganic oxide selected from the group consisting of $SiO_2$, $ZnO$, $SnO_2$, $CaO$, $Fe_xO_y$ and combinations thereof, and a functional coating on at least a portion of the core;
dissolving essentially all of the inorganic oxide of the core of the at least one nanosized template and form the at least one nanosized pore within the matrix thereby forming the nanoporous structure, wherein the functional coating defines at least a portion of the nanosized pore within the matrix.

2. The method of claim 1, wherein the core consists of the inorganic oxide.

3. The method of claim 1, wherein:
    the sol-based silicate is selected from the group consisting of an alkoxysilane, an organosilate, an alkoxyorganosilane, a halosilane, a haloorganosilane, an organoalkoxysilane polymer, and combinations thereof; and
    the sol-based titanates is selected from the group consisting of organotitanates, halotitanates, alkoxytitanates, and combinations thereof; and
    the acid solution comprises one or more acids selected from the group consisting of $H_2SO_4$, $HNO_3$, $H_3PO_4$ and hydrochloric acid.

4. The method of claim 3, wherein:
    the inorganic oxide is ZnO;
    the sol-based ceramic is a sol-based silicate that is an alkoxysilane selected from the group consisting of tetraethoxysilane, tetramethoxysilane, tetrapropoxysilane, and combinations thereof; and
    the acid solution is a hydrochloric acid solution at concentration that is in a range of about 0.01M to about 0.5M.

5. The method of claim 1, wherein each core has a size that is less than about 500 nm.

6. The method of claim 1, wherein each core has a size that is in a range of about 20 nm to about 150 nm.

7. The method of claim 1, wherein each core has a size that is in a range of about 30 nm to about 80 nm.

8. The method of claim 1, wherein the core consists of the inorganic oxide and functional coating that encompasses or essentially encompasses the core such that, upon dissolution of the inorganic oxide of the core, the functional coating defines all or essentially all of the nanosized pore within the matrix.

9. The method of claim 8, wherein a multiplicity of the nanosized templates are functionalized.

10. The method of claim 9, wherein the templated matrix comprises at least two groups of functionalized nanosized templates having functional coatings of distinct composition.

11. The method of claim 8, wherein the functional coating comprises a functional material selected from the group consisting of silanes, halosilanes, alkoxysilanes, organosilanes, organoalkoxysilanes, haloorganosilanes, polymeric alkoxysilanes, polymeric organoalkoxysilanes, and combinations thereof.

12. The method of claim 8, wherein the functional coating has a thickness that is in a range of about 0.1 nm to about 2 nm.

13. The method of claim 1, further comprising forming the templated matrix, which comprises:
    coating the at least one nanosized template with a liquid matrix precursor; and
    curing the liquid matrix precursor of the coated at least one nanosized template thereby forming the tem plated matrix.

14. The method of claim 13, wherein the at least one nanosized template further comprises a compatibilizer coating that allows the liquid matrix precursor to wet the at least one nanosized template.

15. The method of claim 14, wherein the compatibilizer coating comprises a compatibilizer material selected from the group consisting of an organosilane, an alkoxyorganosilane, a haloorganosilane, and combinations thereof.

16. The method of claim 14, wherein the compatibilizer coating has a thickness that is in a range of about 0.1 nm to about 2 nm.

17. The method of claim 1, wherein the nanoporous structure is a shell.

18. The method of claim 17, wherein the ratio of nanosized template to liquid matrix precursor is in a range of about 1:50 to about 1:250 by weight.

19. The method of claim 18, wherein the coating of the nanosized template with the liquid matrix precursor is accomplished by a process selected from the group consisting of liquid phase, milled dry phase, and spray tumbled dry phase.

20. The method of claim 1, wherein the nanoporous structure is a monolith that comprises a multiplicity of the nanosized pores, and the process further comprises placing the nanosized templates coated with liquid matrix precursor in a monolith mold.

21. The method of claim 20, wherein the ratio of nano-sized templates to liquid precursor is in a range of about 1:100 to about 100:1 by weight.

22. The method of claim 21, wherein the coating of the nanosized templates with the liquid matrix precursor is accomplished by stirred liquid phase process.

23. The method of claim 1, wherein the nanoporous structure is a film that comprises a multiplicity of the nanosized pores, and the process further comprises placing the nanosized templates coated with the liquid matrix precursor on a film-forming surface.

24. The method of claim 23, wherein the placing of the nanosized templates coated with the liquid matrix precursor on the film form surface is accomplished by a process selected from the group consisting of spin coating, dip coating, and aerosol coating.

25. The method of claim 11, wherein the inorganic oxide is ZnO, the sol-based ceramic is a sol-based silicate that is an alkoxysilane selected from the group consisting of tetraethoxysilane, tetramethoxysilane, tetrapropoxysilane, and combinations thereof, and the acid is hydrochloric acid and is at concentration that is in a range of about 0.01M to about 0.5M.

* * * * *